United States Patent
Kozui

(10) Patent No.: US 11,124,945 B2
(45) Date of Patent: Sep. 21, 2021

(54) SLEWING-TYPE WORK MACHINE

(71) Applicant: KOBELCO CONSTRUCTION MACHINERY CO., LTD., Hiroshima (JP)

(72) Inventor: Masatoshi Kozui, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 0 days.

(21) Appl. No.: 16/965,164

(22) PCT Filed: Dec. 27, 2018

(86) PCT No.: PCT/JP2018/048015
§ 371 (c)(1),
(2) Date: Jul. 27, 2020

(87) PCT Pub. No.: WO2019/159550
PCT Pub. Date: Aug. 22, 2019

(65) Prior Publication Data
US 2020/0362538 A1    Nov. 19, 2020

(30) Foreign Application Priority Data
Feb. 13, 2018  (JP) .............................. JP2018-022881

(51) Int. Cl.
*E02F 9/12*         (2006.01)
*E02F 9/22*         (2006.01)
(Continued)

(52) U.S. Cl.
CPC .............. *E02F 9/128* (2013.01); *E02F 9/123* (2013.01); *E02F 9/2235* (2013.01);
(Continued)

(58) Field of Classification Search
CPC ... E02F 9/123; E02F 9/128; F15B 2211/7058; F15B 2211/6336; F15B 2211/7135;
(Continued)

(56) References Cited

U.S. PATENT DOCUMENTS

| 7,869,923 B2 * | 1/2011 | Kawaguchi | ............. E02F 9/128 |
| | | | 701/50 |
| 8,505,292 B2 * | 8/2013 | Tsutsui | .................... B66C 23/86 |
| | | | 60/466 |

(Continued)

FOREIGN PATENT DOCUMENTS

| EP | 2 706 150 A1 | 3/2014 |
| JP | 11-140914 A | 5/1999 |

(Continued)

OTHER PUBLICATIONS

International Search Report dated Apr. 2, 2019 in PCT/JP2018/048015 filed on Dec. 27, 2018, 1 page.

(Continued)

*Primary Examiner* — Dustin T Nguyen
(74) *Attorney, Agent, or Firm* — Oblon, McClelland, Maier & Neustadt, L.L.P.

(57) ABSTRACT

A slewing-type work machine includes a slewing state determination section which determines whether or not slewing motion of an upper slewing body is in a deceleration state, and a capacity control section which controls a motor capacity. The capacity control section sets the motor capacity to a capacity set for a combined operation during a performance of the combined operation in which an operation for slewing the upper slewing body and an operation for actuating an attachment are performed simultaneously, while setting the motor capacity to a preset default capacity even during the performance of the combined operation when the slewing state determination section determines that (Continued)

the slewing motion of the upper slewing body is in the deceleration state.

5 Claims, 6 Drawing Sheets

(51) Int. Cl.
 *F15B 11/02* (2006.01)
 *F15B 11/16* (2006.01)
(52) U.S. Cl.
 CPC ........... *E02F 9/2285* (2013.01); *E02F 9/2296* (2013.01); *F15B 11/02* (2013.01); *F15B 11/16* (2013.01); *F15B 2211/20576* (2013.01); *F15B 2211/6309* (2013.01); *F15B 2211/6336* (2013.01); *F15B 2211/715* (2013.01); *F15B 2211/7135* (2013.01); *F15B 2211/755* (2013.01); *F15B 2211/78* (2013.01)
(58) Field of Classification Search
 CPC .......... F15B 2211/715; F15B 2211/755; F15B 11/16; F15B 11/048
 See application file for complete search history.

(56) References Cited

U.S. PATENT DOCUMENTS

| | | | | |
|---|---|---|---|---|
| 9,803,339 | B2* | 10/2017 | Nanjo | ............... F15B 21/14 |
| 9,932,722 | B2* | 4/2018 | Wu | ............... E02F 9/2217 |
| 9,951,795 | B2* | 4/2018 | Shang | ............... E02F 9/2221 |
| 2010/0236232 | A1* | 9/2010 | Boehm | ............... F16H 61/4096 |
| | | | | 60/413 |
| 2014/0044514 | A1 | 2/2014 | Kamimura | |
| 2014/0060018 | A1* | 3/2014 | Ma | ............... F15B 21/14 |
| | | | | 60/327 |
| 2014/0331664 | A1 | 11/2014 | Kamimura | |

FOREIGN PATENT DOCUMENTS

| | | |
|---|---|---|
| JP | 2000-145711 A | 5/2000 |
| JP | 2016-148392 A | 8/2016 |
| JP | 2017-119975 A | 7/2017 |

OTHER PUBLICATIONS

Extended European Search Report dated Feb. 22, 2021 in European Patent Application No. 18905986.8, 5 pages.

* cited by examiner

SLEWING-TYPE WORK MACHINE

TECHNICAL FIELD

The present invention relates to a slewing-type work machine such as a hydraulic excavator.

BACKGROUND ART

A slewing-type work machine generally includes; a lower travelling body; an upper slewing body slewably mounted on the lower travelling body; an attachment mounted on the upper slewing body; a slewing motor formed of a hydraulic motor for slewing the upper slewing body; a hydraulic pump for discharging hydraulic oil to be supplied to the slewing motor; and a slewing control valve interposed between the hydraulic pump and the slewing motor. The slewing control valve opens or closes in response to an operation of a slewing operation lever by an operator, and changes a flow rate of hydraulic oil supplied to the slewing motor out of the hydraulic oil discharged from the hydraulic pump.

The hydraulic oil discharged by the hydraulic pump is often used not only for the slewing motor but also for other hydraulic actuators (for example, a boom cylinder). In this case, the other hydraulic actuator is connected to the hydraulic pump by way of a dedicated control valve different from the slewing control valve. That is, the hydraulic pump is used for both supplying of hydraulic oil to the slewing motor and supplying of hydraulic oil to the other hydraulic actuator.

In such a type of work machine, when a slewing operation for driving the slewing motor and an operation for driving the other hydraulic actuator are performed simultaneously, that is, when a combined operation is performed, the distribution of flow rate of hydraulic oil between a flow rate of hydraulic oil supplied from the hydraulic pump to the slewing motor and a flow rate of hydraulic oil supplied from the hydraulic pump to the other hydraulic actuator becomes important. For example, Patent Literature 1 discloses a hydraulic device which supplies hydraulic oil to a boom cylinder and a slewing hydraulic motor from one hydraulic pump thus driving the boom cylinder and the slewing hydraulic motor. In the hydraulic device of Patent literature 1, a driving of the slewing hydraulic motor and a driving of other actuator are controlled by adjusting tilt capacity of the slewing motor.

When the control for changing a motor capacity of the slewing motor is performed during the performance of the combined operation as described above, a braking characteristic of the slewing motor at the time of deceleration of a slewing speed changes according to the motor capacity, so that a stable deceleration motion cannot be performed. In view of the above circumstances, it is desired to provide a technique for stabilizing braking characteristic at the time of deceleration in terms of safety.

CITATION LIST

Patent Literature

Patent Literature 1: JP 2000-145711A

SUMMARY OF INVENTION

It is an object of the present invention to provide a slewing-type work machine which, at the time of performing a combined operation, can set a motor capacity suitable for the combined operation, and also can obtain a stable braking characteristic when slewing motion of an upper slewing body is decelerated.

Provided is a slewing-type work machine including: a base body; an upper slewing body which is slewably mounted on the base body; an attachment which is mounted on the upper slewing body; a hydraulic pump which discharges hydraulic oil; a slewing motor which is formed of a variable displacement hydraulic motor, the slewing motor being driven so as to slew the upper slewing body with a supply of the hydraulic oil discharged from the hydraulic pump; an actuator which is driven so as to actuate the attachment with a supply of the hydraulic oil discharged from the hydraulic pump; a brake circuit which brakes the slewing motor so as to decelerate slewing motion of the upper slewing body; a slewing state determination section which determines whether or not the slewing motion of the upper slewing body is in a deceleration state; and a capacity control section which controls a motor capacity which is a capacity of the slewing motor which the slewing motor comprises. The capacity control section is configured to set the motor capacity to a capacity set for a combined operation during a performance of the combined operation in which an operation for slewing the upper slewing body and an operation for actuating the attachment are performed simultaneously, while setting the motor capacity to a preset default capacity even during the performance of the combined operation when the slewing state determination section determines that the slewing motion of the upper slewing body is in the deceleration state.

DESCRIPTION OF EMBODIMENTS

A preferred embodiment of the present invention is described with reference to drawings.

Figure 1:
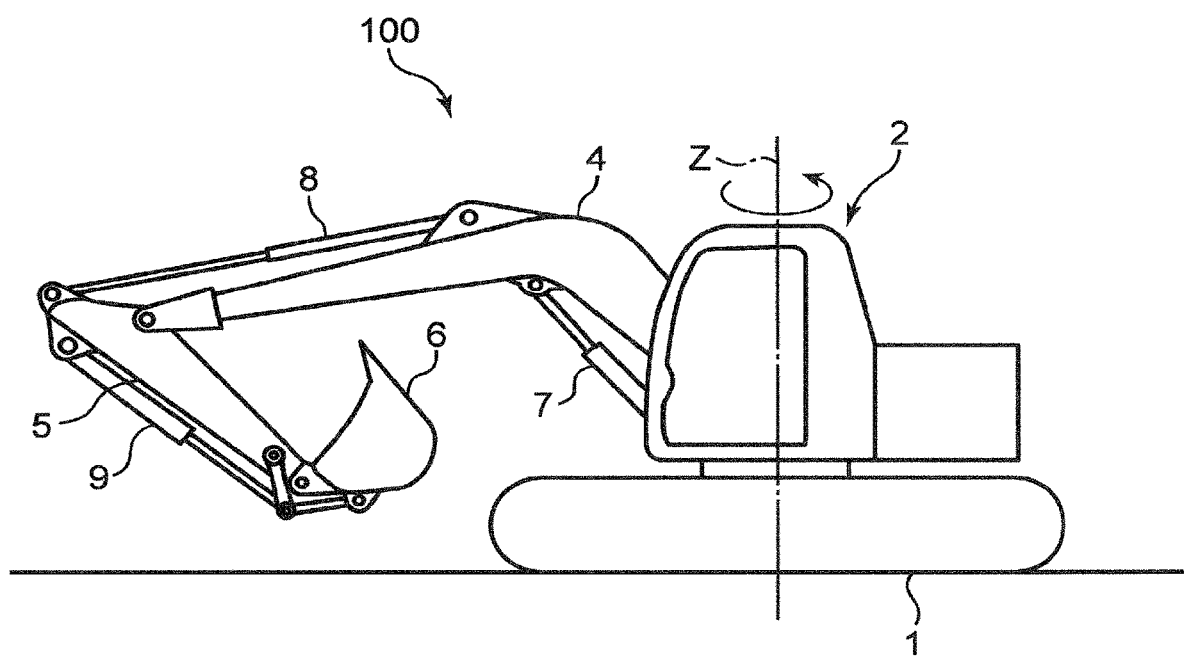
FIG. 1 is a side view showing a slewing-type work machine according to an embodiment of the present invention.

FIG. 1 is a side view showing a hydraulic excavator which forms a slewing-type work machine 100 according to an embodiment of the present invention. The slewing-type work machine 100 includes: a crawler-type lower travelling body 1 which forms a base body; an upper slewing body 2 which is a slewing body slewably mounted on the lower travelling body 1 about a slewing center axis Z perpendicular to a travelling road surface of the lower travelling body 1; an attachment mounted on the upper slewing body 2; and hydraulic actuators for actuating the attachment.

In the present embodiment, the attachment includes: a boom 4 mounted on the upper slewing body 2 so as to be raisable and lowerable; an arm 5 mounted on a distal end of the boom 4; and a bucket 6 mounted on a distal end of the arm 5. The hydraulic actuators include: a boom cylinder 7 for actuating the boom 4; an arm cylinder 8 for actuating the arm 5; and a bucket cylinder 9 for actuating the bucket 6.

The slewing-type work machine according to the present invention is not limited to the above-described hydraulic excavator. The present invention is applicable to various slewing-type work machines (for example, a slewing-type crane) each including a lower travelling body 1 and an upper slewing body 2 slewably mounted on the lower travelling body 1. Accordingly, the attachment and the hydraulic actuators are appropriately selected according to a type of the slewing-type work machine. The base body is not limited to a body which can travel such as the lower travelling body 1, but may be a base which is installed at a specific place and supports a slewing body.

Figure 2:
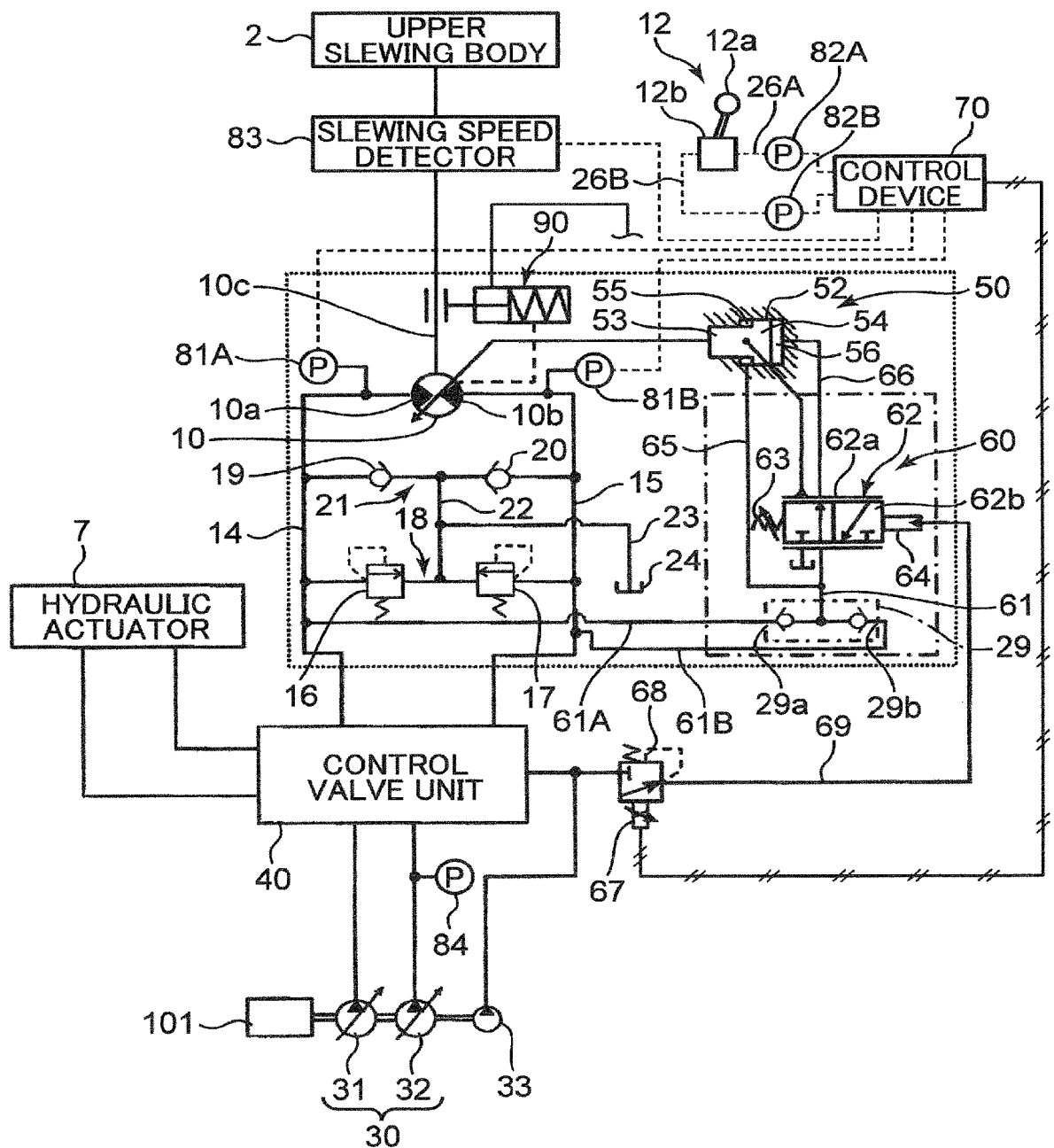
FIG. 2 is a diagram showing a hydraulic circuit mounted on the slewing-type work machine according to the embodiment.

FIG. 2 is a diagram showing a hydraulic circuit mounted on the slewing-type work machine 100 according to the embodiment. This hydraulic circuit shows a part relating to slewing driving of the upper slewing body 2 and raising and lowering driving of the boom 4. The hydraulic circuit includes: a slewing motor 10 which is a hydraulic motor for slewing driving the upper slewing body 2; a hydraulic actuator 7 (boom cylinder 7) for raising or lowering the boom 4; a hydraulic pump 30 and a pilot pump 33 which are connected to an output shaft of the engine 101; and a control valve unit 40.

The slewing motor 10 has an output shaft 10c which rotates with a supply of hydraulic oil, and the output shaft 10c is connected to the upper slewing body 2 so as to slew the upper slewing body 2 in both leftward and rightward directions. Specifically, the slewing motor 10 has a first port 10a and a second port 10b. With a supply of hydraulic oil to one of the first and second ports 10a and 10b, the output shaft 10c rotates in a direction corresponding to the one port, and the slewing motor 10 discharges the hydraulic oil from the other port.

The boom cylinder 7 is interposed between the boom 4 and the upper slewing body 2 so as to move the boom 4 in a raising direction and a lowering direction respectively by the extension and contraction of the boom cylinder 7.

The hydraulic pump 30 discharges hydraulic oil for driving the slewing motor 10 and the boom cylinder 7. In the present embodiment, the hydraulic pump 30 includes a plurality of hydraulic pumps, specifically, a first hydraulic pump 31 and a second hydraulic pump 32. However, the hydraulic pump 30 may be formed of a single hydraulic pump.

The first hydraulic pump 31, the second hydraulic pump 32, and the pilot pump 33 are all driven by the engine 101, and thereby discharge hydraulic oil in a tank (not shown). Specifically, the first and second hydraulic pumps 31, 32 discharge hydraulic oil for driving the boom cylinder 7. Further, the second hydraulic pump 32 discharges hydraulic oil for driving the slewing motor 10. That is, both the slewing motor 10 for rotating the upper slewing body 2 and the boom cylinder 7 for actuating the boom 4 are connected to the second hydraulic pump 32 in common.

The pilot pump 33 discharges pilot oil for supplying a pilot pressure to a plurality of control valves mounted on a control valve unit 40 described later for opening or closing these control valves.

The control valve unit 40 is interposed between the hydraulic pump 30 and the slewing motor 10, and operates so as to change a direction and a flow rate of hydraulic oil supplied from the hydraulic pump 30 to the slewing motor 10. The control valve unit 40 is also interposed between the hydraulic pump 30 and the boom cylinder 7, and operates so as to change a direction and a flow rate of the hydraulic oil supplied from the hydraulic pump 30 to the boom cylinder 7. It is sufficient for the control valve unit 40 to have such functions, and the specific configuration of the control valve unit 40 is not particularly limited. An example of the control valve unit 40 is described hereinafter.

The control valve unit 40 includes, for example, a boom first-speed control valve, a boom second-speed control valve, and a slewing control valve (all of which are not shown).

The boom first-speed control valve is a control valve which is interposed between the first hydraulic pump 31 and the boom cylinder 7. The boom first-speed control valve guides hydraulic oil for driving the boom cylinder 7 from the first hydraulic pump 31 to the boom cylinder 7, and controls a direction and a flow rate of the hydraulic oil.

The boom second-speed control valve is a control valve which is interposed between the second hydraulic pump 32 and the boom cylinder 7. The boom second-speed control valve guides hydraulic oil for accelerating driving of the boom 4 from the second hydraulic pump 32 to the boom cylinder 7, in addition to the hydraulic oil supplied to the boom cylinder 7 through the boom first-speed control valve, and controls a direction and a flow rate of the hydraulic oil.

The slewing control valve is interposed between the second hydraulic pump 32 and the slewing motor 10, and introduces hydraulic oil for driving the slewing motor 10 from the second hydraulic pump 32 to either one of the first port 10a and the second port 10b of the slewing motor 10. That is, the slewing control valve is a control valve for controlling a direction and a flow rate of the hydraulic oil supplied to the slewing motor 10.

Each of these control valves is formed of a pilot-operated hydraulic selector valve. With a supply of a pilot pressure from the pilot pump 33 to a pilot port of each control valve, the control valve opens with a stroke corresponding to a magnitude of the pilot pressure. Accordingly, each control valve allows a supply of the hydraulic oil to the slewing motor 10 or the boom cylinder 7 at a flow rate corresponding to the stroke. Accordingly, the flow rate can be controlled by changing the pilot pressure.

The hydraulic circuit shown in FIG. 2 further includes a slewing operation device 12, a right slewing line 14, a left slewing line 15, a relief valve circuit 18, a check valve circuit 21, a communication line 22, and a makeup line 23.

The slewing operation device 12 has a slewing operation lever 12a and a pilot valve 12b. The slewing operation lever 12a is an operation member, and when a slewing command operation is given to the slewing operation lever 12a by an operator, the slewing operation lever 12a turns in a direction of the slewing command operation. The pilot valve 12b has an inlet port (not shown) connected to the pilot pump 33, and a pair of outlet ports (not shown). The pair of outlet ports is connected to a right slewing pilot port and a left slewing pilot port (which are not shown) of the slewing control valve of the control valve unit 40 via a right slewing pilot line and a left slewing pilot line (which are not shown) respectively. The pilot valve 12b is connected to the slewing operation lever 12a. The pilot valve 12h is configured to open so as to allow the supply of a pilot pressure corresponding to a magnitude of a slewing command operation from the pilot pump 33 to the pilot port which corresponds to the direction of the slewing command operation given to the slewing operation lever 12a out of the right slewing pilot port and the left slewing pilot port. Although the slewing operation device 12 is illustrated at a position shown in FIG. 2 for convenience, the slewing operation device 12 is actually interposed between the pilot pump 33 and the control valve unit 40 (specifically, the slewing control valve).

The relief valve circuit 18, the check valve circuit 21, the communication line 22, and the makeup line 23 form a brake circuit for braking the slewing motor 10. Note that the brake circuit for braking the slewing motor 10 is not limited to the configuration shown in FIG. 2.

The relief valve circuit 18 connects the right slewing line 14 and the left slewing line 15 to each other by bypassing the slewing motor 10. The relief valve circuit 18 includes a left slewing relief valve 16 and a right slewing relief valve 17. The left slewing relief valve 16 and the right slewing relief valve 17 are arranged such that an inlet port of the left slewing relief valve 16 is connected to the right slewing line 14, an inlet port of the right slewing relief valve 17 is connected to the left slewing line 15, and outlet ports of both relief valves 16, 17 are connected to each other.

The check valve circuit 21 connects both the slewing lines 14 and 15 to each other at a position closer to the slewing motor 10 than the relief valve circuit 18 is. The check valve circuit 21 includes a left slewing check valve 19 and a right slewing check valve 20. The left slewing check valve 19 is arranged in a direction in which the left slewing check valve 19 prevents the inflow of the hydraulic oil from the right slewing line 14, and the right slewing check valve 20 is arranged in a direction in which the right slewing check valve 20 prevents the inflow of the hydraulic oil from the left slewing line 15.

The communication line 22 connects a portion of the relief valve circuit 18 positioned between the left slewing relief valve 16 and the right slewing relief valve 17 and a portion of the check valve circuit 21 positioned between the left slewing check valve 19 and the right slewing check valve 20 to each other. The makeup line 23 connects the communication line 22 and a tank 24 to each other. Such a configuration allows sucking of hydraulic oil from the tank 24 to the communication line 22 through the makeup line 23 when the communication line 22 becomes a negative pressure, so that the occurrence of cavitation is prevented. A back pressure valve (not shown) is mounted on the makeup line 23.

In this hydraulic circuit, for example, when the slewing operation lever 12a is returned to a neutral position during the right slewing motion so that the slewing control valve of the control valve unit 40 returns to the neutral position from the previous right slewing position, the slewing control valve shuts off the communication between both slewing lines 14 and 15 and the hydraulic pump 30 (specifically, the second hydraulic pump 32). On the other hand, the slewing motor 10 continues its rotation in the right slewing direction due to an inertia of the upper slewing body 2. Accordingly, a pressure in the left slewing line 15 on a meter-out side increases. When the pressure reaches a set pressure of the right slewing relief valve 17, the right slewing relief valve 17 is opened. This opening of the right slewing relief valve 17 allows the hydraulic oil in the left slewing line 15 to flow into the slewing motor 10 through the right slewing relief valve 17, the communication line 22, and the left slewing check valve 19, and the right slewing line 14. As a result, a braking force attributed to an action of the relief valve 17 is applied to the slewing motor 10 which continues its rotation due to an inertia, thereby decelerating and stopping the slewing motor 10. The same applies to a case where the left slewing motion is decelerated and stopped.

The hydraulic circuit shown in FIG. 2 further includes a capacity operation section 50, a hydraulic pressure supply control section 60, a capacity pilot line 69, a pilot pressure operation valve 68, a control device 70, a slewing parking brake 90, and a plurality of sensors.

The plurality of sensors include hydraulic oil pressure detectors 81A and 81B, slewing operation detection sections 82A and 82B, a slewing speed detector 83, and a pump operating pressure detector 84.

The hydraulic oil pressure detectors 81A and 81B are configured by: a first motor pressure sensor 81A which generates a first motor pressure detection signal corresponding to a pressure of hydraulic oil at the first port 10a of the slewing motor 10; and a second motor pressure sensor 81B which generates a second motor pressure detection signal corresponding to a pressure of hydraulic oil at the second port 10b of the slewing motor 10. The hydraulic oil pressure detectors 81A and 81B input motor pressure detection signals to the control device 70 respectively.

The slewing operation detection sections 82A and 82B are configured by a right slewing pilot pressure sensor 82A and a left slewing pilot pressure sensor 82B which respectively generate slewing pilot pressure detection signals corresponding to slewing pilot pressures inputted to the pair of slewing pilot ports of the slewing control valve. The right slewing pilot pressure sensor 82A and the left slewing pilot pressure sensor 82B respectively generate pilot pressure detection signals corresponding to a right slewing pilot pressure and a left slewing pilot pressure in the right slewing pilot line 26A and the left slewing pilot line 26B, and respectively input the signals to the control device 70. Accordingly, the right slewing pilot pressure sensor 82A and the left slewing pilot pressure sensor 82B detect that a slewing command operation is given to the slewing operation lever 12a of the slewing operation device 12, and supply the information to the control device 70.

The slewing speed detector 83 is a sensor which can detect a magnitude of a slewing speed of the upper slewing body 2 and a slewing direction of the upper slewing body 2. As the slewing speed detector 83, for example, an encoder, a resolver, a gyro sensor or the like which can detect motion of the upper slewing body 2 can be used. The slewing speed detector 83 converts a magnitude of a detected slewing speed, a detected slewing direction, and the like of the upper slewing body 2 into electrical signals (slewing speed detection signals), and inputs the signals to the control device 70.

The pump operating pressure detector 84 generates an operating pressure detection signal corresponding to an operating pressure of the hydraulic pump 30 (second hydraulic pump 32), and inputs the operating pressure detection signal to the control device 70.

The slewing parking brake 90 is a brake device for applying a mechanical stop holding force to the upper slewing body 2 so as to hold the upper slewing body 2 in a stop state when the upper slewing body 2 is not driven by the slewing motor 10. The slewing parking brake 90 can be switched between a brake state where the slewing parking brake 90 applies the stop holding force to the upper slewing body 2 and a brake release state where the slewing parking brake 90 releases the upper slewing body 2 such that the upper slewing body 2 is slewable.

The capacity operation section 50 and the hydraulic pressure supply control section 60 form a capacity control device together with the control device 70. The capacity control device controls a capacity of the slewing motor 10, that is, a displacement volume of the slewing motor 10, using a hydraulic pressure in response to a slewing command operation given to the slewing operation lever 12a.

The capacity operation section 50 changes the capacity of the slewing motor 10 with a supply of a capacity operation hydraulic pressure which is controlled by the hydraulic pressure supply control section 60. The capacity operation section 50 has: a capacity operation cylinder 52 which surrounds a piston chamber; and a capacity operation piston 54 which is disposed in the piston chamber of the capacity operation cylinder 52. The capacity operation piston 54 is displaceable in an axial direction in the piston chamber, and is slidable on an inner peripheral surface of the capacity operation cylinder 52. The capacity operation piston 54 is connected to the slewing motor 10 so as to change a motor capacity of the slewing motor 10 by the displacement of the capacity operation piston 54 in the axial direction. For example, when the slewing motor 10 is an axial piston type motor, the tilt of a swash plate of the slewing motor 10 is changed.

Specifically, the capacity operation piston 54 is connected to the slewing motor 10 by way of a rod 53 which extends from the capacity operation piston 54 in a penetrating manner through a first hydraulic chamber 55. The capacity operation piston 54 partitions the inside of the piston chamber into the first hydraulic chamber 55 and a second hydraulic chamber 56, and increases a capacity of the slewing motor 10 along with the displacement of the capacity operation piston 54 in a direction in which a volume of the first hydraulic chamber 55 is increased (the displacement toward a right side in FIG. 1). The position of the capacity operation piston 54 in an axial direction depends on the balance between a first capacity operation hydraulic pressure supplied to the first hydraulic chamber 55 and a second capacity operation hydraulic pressure supplied to the second hydraulic chamber 56. That is, the lower the second capacity operation hydraulic pressure becomes with respect to the first capacity operation hydraulic pressure, the more the capacity operation piston 54 is displaced in a direction in which the capacity of the slewing motor 10 is increased (rightward in FIG. 1).

A pressure receiving area which is an area where the capacity operation piston 54 receives a capacity operation hydraulic pressure in the first hydraulic chamber 55 is smaller than a pressure receiving area in the second hydraulic chamber 56 by an amount of a cross-sectional area of the rod 53. Due to the difference in cross-sectional area, it is possible to hold the capacity operation piston 54 at the position where a volume of the second hydraulic chamber 56 becomes maximum, that is, at the position where a capacity of the slewing motor 10 becomes minimum (leftmost position in FIG. 1) when the first capacity operation hydraulic pressure is substantially equal to the second capacity operation hydraulic pressure.

The hydraulic pressure supply control section 60 controls the position of the capacity operation piston 54 by changing the magnitude relation between the first capacity operation hydraulic pressure and the second capacity operation hydraulic pressure, and thereby controls a capacity of the slewing motor 10 such that the capacity corresponds to the position.

The supply control section 60 according to this embodiment supplies a capacity operation hydraulic pressure to the capacity operation section 50 and changes the capacity operation hydraulic pressure by making use of hydraulic oil from the right slewing line 14 or the left slewing line 15. As shown in FIG. 2, the supply control section 60 includes a hydraulic pressure supply line 61, a first branch line 61A and a second branch line 61B, a hydraulic pressure supply control valve 62, and a shuttle valve 29.

The hydraulic pressure supply line 61 connects the shuttle valve 29 and the hydraulic pressure supply control valve 62 to each other. The hydraulic pressure supply line 61 is branched at the position between the shuttle valve 29 and the hydraulic pressure supply control valve 62, and connects the shuttle valve 29 and the capacity operation section 50 to each other by a branched portion. A first branch line 61A connects the right slewing line 14 and a first input portion 29a of the shuttle valve 29 to each other. A second branch line 61B connects the left slewing line 15 and a second input portion 29b of the shuttle valve 29 to each other.

The shuttle valve 29 makes the input portion on a higher pressure side out of the first input portion 29a and the second input portion 29b communicate with the hydraulic pressure supply line 61, and shuts off the communication between the input portion on a lower pressure side and the hydraulic pressure supply line 61. Accordingly, by guiding hydraulic oil discharged from the line on a higher pressure side out of the right slewing line 14 and the left slewing line 15 to the capacity operation section 50 through the branch line, a capacity operation hydraulic pressure is supplied to the first hydraulic chamber 55 and the second hydraulic chamber 56 of the capacity operation section 50.

Specifically, the hydraulic pressure supply line 61 is divided into a first hydraulic line 65 connected to the first hydraulic chamber 55 and a second hydraulic line 66 connected to the second hydraulic chamber 56. The hydraulic pressure supply control valve 62 is mounted on an intermediate portion of the second hydraulic line 66. The hydraulic pressure supply control valve 62 lowers a second capacity operation hydraulic pressure supplied to the second hydraulic chamber 56 through the second hydraulic line 66 relative to a first capacity operation hydraulic pressure supplied to the first hydraulic chamber 55 through the first hydraulic line 65 at a degree which corresponds to a magnitude of a capacity pilot pressure applied to the hydraulic pressure supply control valve 62.

The hydraulic pressure supply control valve 62 according to this embodiment is formed of a pilot-operated servo valve, and includes a sleeve 62a, a spool 62b slidably disposed in the sleeve 62a, and a spring 63 and a pilot port 64 which are respectively disposed on both sides of the spool 62b in an axial direction of the spool 62b. When a capacity pilot pressure is not supplied to the pilot port 64, the spool 62b is held at a fully open position (a left side position in FIG. 2) at which the second hydraulic line 66 is opened with a maximum opening area by a spring force of the spring 63. On the other hand, when a capacity pilot pressure is supplied to the pilot port 64, the spool 62b is displaced in a closing direction (leftward in FIG. 2) from the fully open position with a stroke which corresponds to a magnitude of the capacity pilot pressure. Accordingly, a second capacity operation hydraulic pressure supplied to the second hydraulic chamber 56 is lowered relative to a first capacity operation hydraulic pressure supplied to the first hydraulic chamber 55.

The capacity pilot line 69 supplies a capacity pilot pressure to the pilot port 64 by guiding hydraulic oil discharged from the pilot pump 33 to a pilot port 64 of the hydraulic pressure supply control valve 62.

The pilot pressure operation valve 68 is provided at an intermediate portion of the capacity pilot line 69, and opens at a degree of opening corresponding to a magnitude of a capacity command upon receiving an input of the capacity command from the control device 70 and hence, a capacity pilot pressure supplied to the pilot port 64 is increased. The pilot pressure operation valve 68 according to this embodiment is formed of an electromagnetic proportional valve having a solenoid 67. The solenoid 67 receives the supply of the exciting current as the capacity command.

When the exciting current is not supplied to the solenoid 67 (that is, when the capacity command is not inputted), the pilot pressure operation valve 68 is closed so as to shut off the capacity pilot line 69 thus preventing the supply of the capacity pilot pressure to the pilot port 64. On the other hand, when the exciting current is supplied to the solenoid 67 (that is, when the capacity command is inputted), the pilot pressure operation valve 68 is opened so as to open the capacity pilot line 69 at a degree of opening corresponding to a magnitude of the exciting current and to allow the supply of a capacity pilot pressure with a magnitude corresponding to the degree of opening to the pilot port 64.

Figure 3:
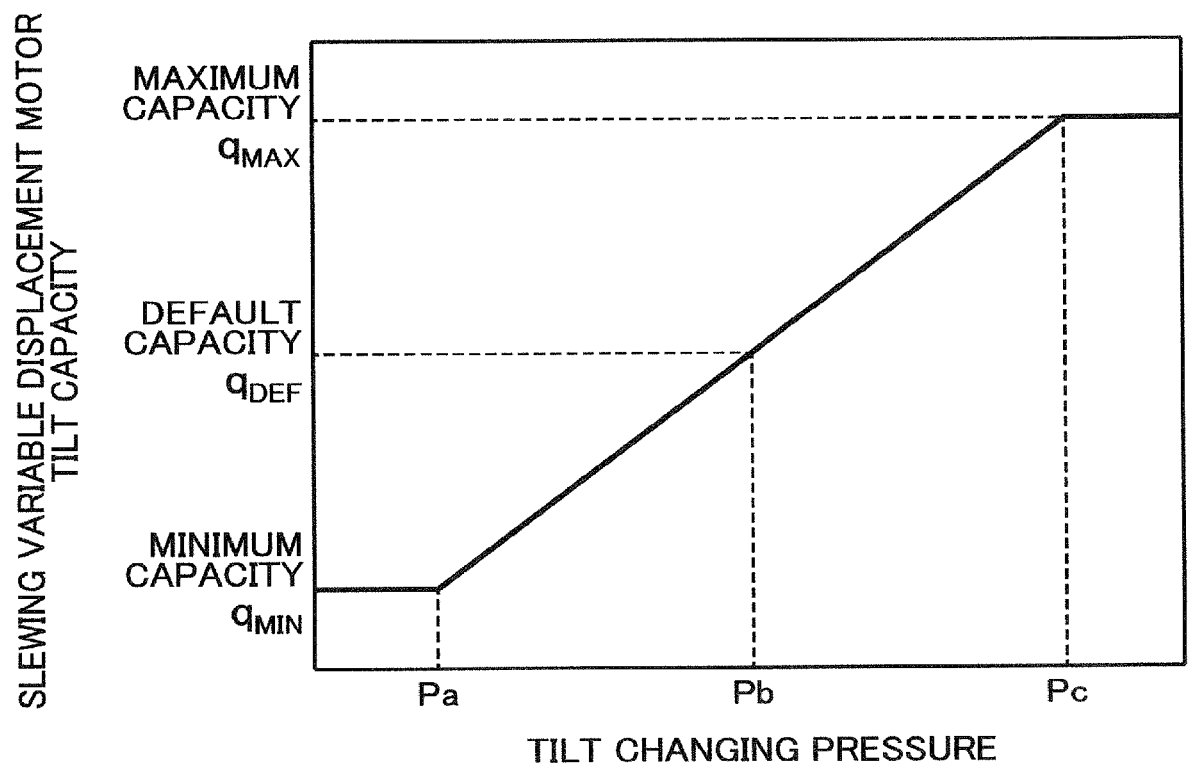
FIG. 3 is a graph showing a relationship between a tilt changing pressure and a tilt capacity of a slewing motor in the slewing-type work machine according to the embodiment.

FIG. 3 is a graph showing a relationship between a tilt changing pressure and a tilt capacity of the slewing motor 10 in the slewing-type work machine 100 according to the embodiment. The slewing motor 10 in FIG. 3 is a swash plate type axial piston motor whose motor capacity changes when a tilt angle of the swash plate changes. However, the slewing motor 10 is not limited to this type of motor.

The motor capacity of the slewing motor 10 is set to a preset default capacity when a capacity pilot pressure supplied to the pilot port 64 is pressure Pb. Further, the motor capacity of the slewing motor 10 is set to a minimum capacity smaller than the default capacity when the capacity pilot pressure is equal to or less than a pressure Pa, and is set to a maximum capacity larger than the default capacity when a capacity pilot pressure is equal to or more than a pressure Pc. As described above, the motor capacity of the slewing motor 10 can be set to an arbitrary value ranging from the minimum capacity to the maximum capacity by changing the capacity pilot pressure between the pressure Pa and the pressure Pc.

The default capacity is a value preset for the motor capacity of the slewing motor 10. The default capacity is a value set in advance for deceleration of slewing motion of the upper slewing body. In other words, the default capacity is a motor capacity used when the slewing motion of the upper slewing body 2 is in a deceleration state. In the present embodiment, the default capacity is a value smaller than the maximum capacity of the motor capacity and larger than the minimum capacity of the motor capacity. The default capacity is a motor capacity which is set in advance so as to reduce both a load on equipment due to an over torque and a shortage of a brake torque when braking of the slewing motor 10 is performed by the above-mentioned brake circuit, and is appropriately set based on the characteristics of the slewing-type work machine 100. Data corresponding to the default capacity is stored in the control device 70.

The control device 70 is configured by a microcomputer, for example. The control device 70 is configured by a central processing unit (CPU), a read only memory (ROM) which stores various control programs, a random access memory (RAM) which is used as a working area of the CPU, and the like.

Figure 4:
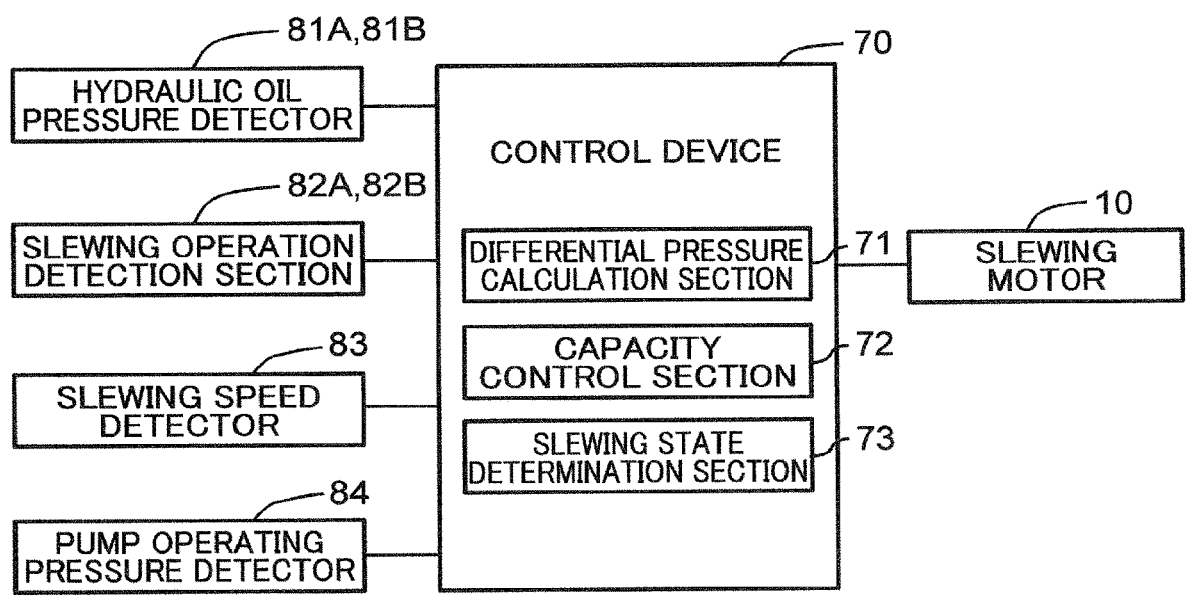
FIG. 4 is a block diagram showing a functional configuration of the slewing-type work machine according to the embodiment.

FIG. 4 is a block diagram showing a functional configuration of the slewing-type work machine 100 according to the embodiment. As shown in FIG. 4, the control device 70 includes a differential pressure calculation section 71, a capacity control section 72, and a slewing state determination section 73 as functions thereof. The control device 70 operates so as to functionally configure the differential pressure calculation section 71, the capacity control section 72, and the slewing state determination section 73 by allowing the CPU to execute the control programs. The control device 70 executes the control programs based on signals inputted from the hydraulic oil pressure detectors 81A and 81B, the slewing operation detection sections 82A and 82B, the slewing speed detector 83, the pump operating pressure detector 84, and the like, thus controlling motions of the slewing-type work machine 100 (a motion of the slewing motor 10 and the like).

The differential pressure calculation section 71 has a function of calculating a motor differential pressure $\Delta P$ (effective differential pressure $\Delta P$) of the slewing motor 10 based on detection values detected by the hydraulic oil pressure detectors 81A and 81B. Specifically, the differential pressure calculation section 71 performs the following calculation.

Assume a pressure of the hydraulic oil at the first port 10a of the slewing motor 10 as a pressure MA, and assume a pressure of the hydraulic oil at the second port 10b as a pressure MB. When hydraulic oil is supplied to the first port 10a and is discharged from the second port 10b during rightward slewing motion of the upper slewing body 2, the differential pressure calculation section 71 calculates a motor differential pressure $\Delta P$ based on an equation $\Delta P=MA-MB$. Further, when hydraulic oil is supplied to the second port 10b and is discharged from the first port 10a during leftward slewing motion of the upper slewing body 2, the differential pressure calculation section 71 calculates a motor differential pressure $\Delta P$ based on an equation $\Delta P=MB-MA$.

The slewing state determination section 73 has a function of determining a slewing state of the upper slewing body 2. The function of the slewing state determination section 73 is described later based on a flowchart shown in FIG. 6.

The capacity control section 72 has a function of controlling a motor capacity of the slewing motor 10. The capacity control section 72 controls a motor capacity such that the motor capacity of the slewing motor 10 becomes a set capacity during a performance of the combined operation. Accordingly, the slewing motion of the upper slewing body 2 becomes suitable for the operator's preference during the performance of the combined operation. On the other hand, when the slewing state determination section 73 determines that the slewing motion of the upper slewing body 2 is in a deceleration state, the capacity control section 72 controls the motor capacity such that the motor capacity becomes the default capacity regardless of whether or not the combined operation is being performed. With such a control, it is possible to decrease a load on equipment attributed to an over torque which may occur when the motor capacity of the slewing motor 10 is set to a first set capacity which is set in advance and is larger than the default capacity during the deceleration of slewing motion of the upper slewing body 2 and, further, it is possible to avoid a shortage of a brake torque which may occur when the motor capacity is set to a second set capacity which is set in advance and is smaller than the default capacity. Accordingly, at the time of deceleration of slewing motion of the upper slewing body 2, the constantly stable braking performance (stop performance) can be obtained by the brake circuit. The set capacity is the capacity of the motor set for the combined operation. The set capacity may be a value set in advance. Further, the set capacity may be a value which is set corresponding to a load of a slewing motion of the upper slewing body 2, a load of a motion of the attachment (for example, the boom 4), a posture of the slewing-type work machine 100 (a variation value that changes according to a state of the slewing-type work machine), for example. Specific examples are described hereinafter.

Figure 5:
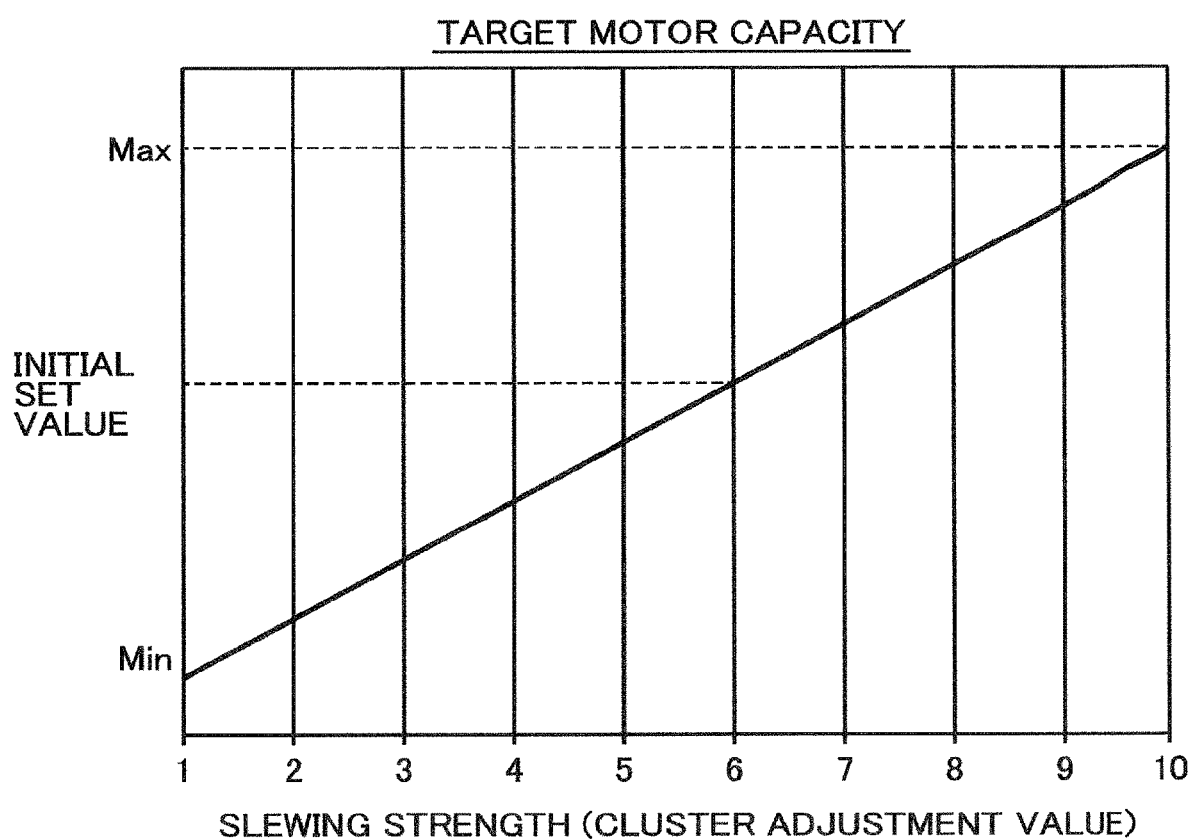
FIG. 5 is a graph showing an example where a target motor capacity of a slewing motor is set in the slewing-type work machine according to the embodiment.

For example, the capacity control section 72 can set the motor capacity during the performance of the combined operation based on a target motor capacity set in advance as follows. FIG. 5 is a graph showing an example where a target motor capacity of the slewing motor 10 is set in the slewing-type work machine 100 according to the embodiment.

In FIG. 5, a vertical axis represents a motor capacity of the slewing motor 10, and a horizontal axis represents a slewing strength (a cluster adjustment value) of the slewing motor 10. The slewing strength taken on the horizontal axis in FIG. 5 is a value which allows an operator to select by preference the slewing acceleration of the upper slewing body 2 during a performance of a combined operation in which a slewing motion of the upper slewing body 2 and a raising and lowering motion of the boom 4 are performed simultaneously. The slewing strength is classified into a plurality of levels (for example, ten grades). When an operator operates the slewing-type work machine 100, with respect to the slewing motion of the upper slewing body 2 and the raising and lowering motion of the boom 4, there may be a case where each operator has preference in operation such as a case where the operator wants to perform the slewing motion of the upper slewing body 2 prior to the raising and lowering motion of the boom 4, a case where the operator wants to perform the raising and lowering motion of the boom 4 prior to slewing motion of the upper slewing body 2 or the like corresponding to the workability, the operation purpose, and the operation skill of the operator. For example, in the case where the operator wants to perform the slewing motion of the upper slewing body 2 prior to the raising and lowering motion of the boom 4 during the performance of the combined operation, the operator selects the higher grade from the ten grades, whereas in the case where the operator wants to perform the raising and lowering motion of the boom 4 prior to the slewing motion of the upper slewing body 2 during the performance of the combined operation, the operator selects the lower grade from the ten grades. Specifically, for example, before operating the slewing-type work machine 100, the operator selects a slewing strength level from the ten grades using an operation panel (not shown). A signal corresponding to a selected level is inputted to the control device 70. Motor capacities corresponding to slewing strengths at respective grades are stored in the control device 70 in advance.

Based on the setting example of the target motor capacity shown in FIG. 5 described above, the motor capacity is set and is controlled as follows, for example. That is, the capacity setting section provided in the control device 70 as a function of the control device 70 sets a capacity corresponding to a slewing strength selected by an operator from the motor capacities corresponding to the slewing strengths of plural grades stored in the control device 70 in advance to the set capacity (target motor capacity) during the performance of the combined operation, and the control device 70 stores the set capacity. Further, during the performance of the combined operation, the capacity control section 72 controls the motor capacity of the slewing motor 10 such that the motor capacity of the slewing motor 10 becomes the set capacity set by the capacity setting section. Specifically, the capacity control section 72 regulates a capacity pilot pressure supplied to the pilot port 64 by controlling the pilot pressure operation valve 68 such that the motor capacity becomes the set capacity. Accordingly, during the performance of the combined operation in which the slewing motion of the upper slewing body 2 and the raising and lowering motion of the boom 4 are performed simultaneously, the motor capacity of the slewing motor 10 is automatically set to the set capacity.

The "initial set value" on the vertical axis in FIG. 5 is an initial value of the motor capacity which is automatically set at the time of starting the slewing-type work machine 100. Further, "Max" on the vertical axis in FIG. 5 is the motor capacity which corresponds to the maximum capacity in FIG. 3, and "Min" on the vertical axis is the motor capacity which corresponds to the minimum capacity in FIG. 3. Accordingly, when an operator does not set a slewing strength level or before the operator sets the slewing strength level, the motor capacity is set to the initial set value. In the present embodiment, the initial set value of the motor capacity in FIG. 5 is the same value as the default capacity in FIG. 3. However, the initial set value may be a value different from the default capacity.

Figure 6:
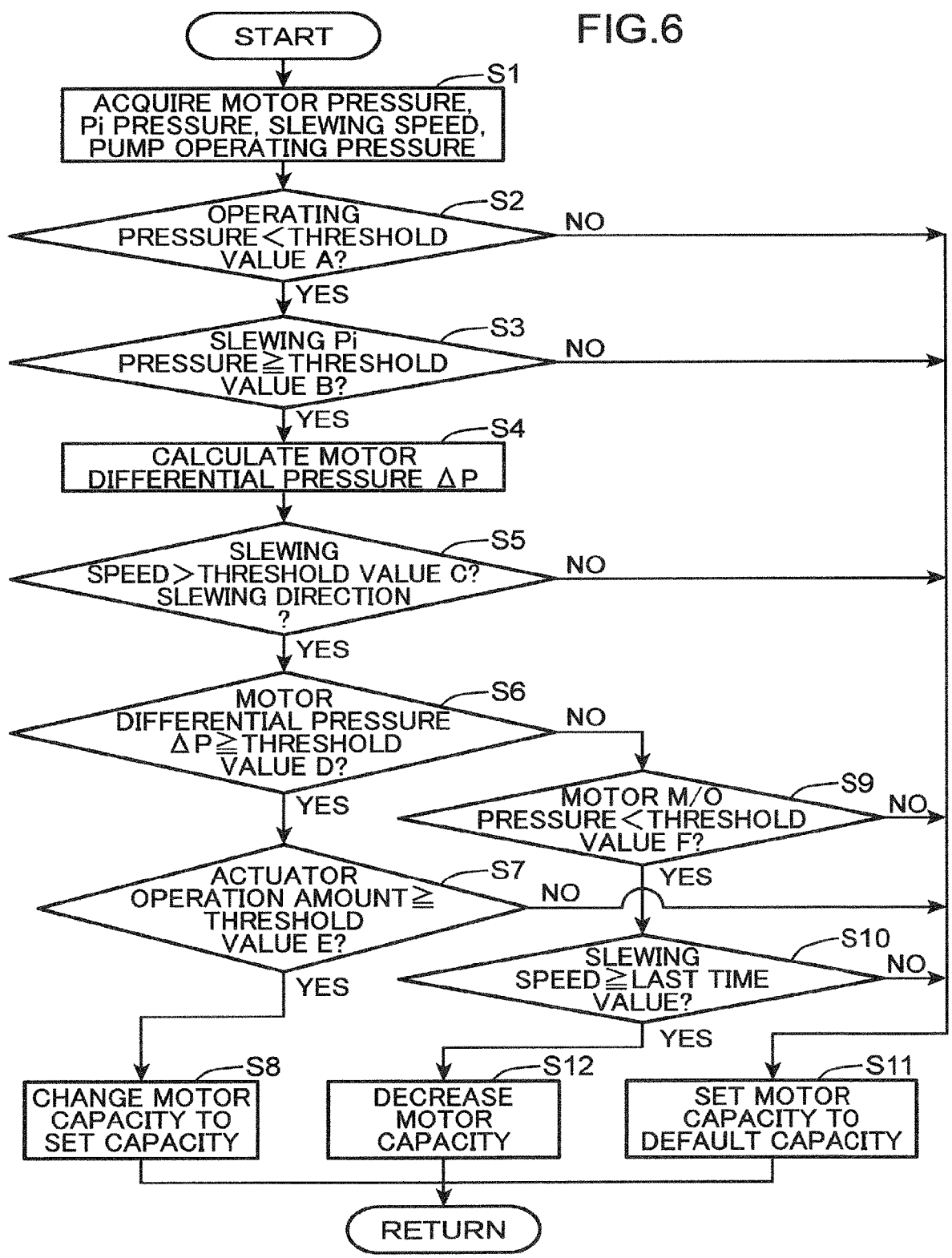
FIG. 6 is a flowchart showing an example where the slewing-type work machine according to the embodiment is controlled.

FIG. 6 is a flowchart showing a control example in the slewing-type work machine 100 according to the embodiment.

The control device 70 reads various detection signals which are inputted to the control device 70 (step S1). Specifically, the control device 70 acquires: a first motor pressure detection signal and a second motor pressure detection signal detected by the hydraulic oil pressure detectors 81A and 81B; a slewing pilot pressure detection signal detected by the slewing operation detection sections 82A and 82B; a slewing speed detection signal corresponding to a magnitude of a slewing speed, a slewing direction, and the like of the upper slewing body 2 detected by the slewing speed detector 83; and an operating pressure detection signal corresponding to an operating pressure of the second hydraulic pump 32 detected by the pump operating pressure detector 84. The control device 70 stores data relating to these signals.

The control device 70 determines whether or not an operating pressure of the second hydraulic pump 32 is less than a preset threshold value A based on an operating pressure detection signal (step S2). When an operating pressure of the second hydraulic pump 32 is equal to or more than the threshold value A (NO in step S2), the capacity control section 72 sets the motor capacity of the slewing motor 10 to a default capacity (step S11). That is, by setting the motor capacity of the slewing motor 10 to the default capacity when an operating pressure of the second hydraulic pump 32 is a pressure equal to or more than the threshold value A, it is possible to prevent a slewing torque of the slewing motor 10 from becoming excessively large. On the other hand, when an operating pressure of the second hydraulic pump 32 is less than the threshold value A (YES in step S2), the slewing state determination section 73 determines whether or not a slewing pilot pressure is equal to or more than a preset threshold value B based on a slewing pilot pressure detection signal (step S3).

When the slewing pilot pressure is less than the threshold value B (NO in step S3), that is, when a slewing operation has not been performed by an operator, the capacity control section 72 sets the motor capacity of the slewing motor 10 to the default capacity (step S11). On the other hand, when the slewing pilot pressure is equal to or more than the threshold value B (YES in step S3), that is, when the slewing operation is performed by the operator, the differential pressure calculation section 71 calculates a motor differential pressure $\Delta P$ (effective differential pressure $\Delta P$) of the slewing motor 10 based on motor pressure detection signals corresponding to detection values detected by the hydraulic oil pressure detectors 81A and 81B (step S4). The control device 70 stores the calculation result.

The slewing state determination section 73 determines whether or not a slewing speed of the slewing motor 10 (a slewing speed of the upper slewing body 2) is more than a preset threshold value C based on a slewing speed detection signal which corresponds to a magnitude of a slewing speed, a slewing direction, and the like of the upper slewing body 2 detected by the slewing speed detector 83. The slewing state determination section 73 also determines whether or not the slewing direction of the slewing motor 10 (the slewing direction of the upper slewing body 2) agrees with the direction of a slewing operation of the slewing operation lever 12a performed by an operator (step S5).

When a magnitude of the slewing speed of the slewing motor 10 is equal to or less than the preset threshold value C (NO in step S5), that is, when the upper slewing body 2 is not substantially slewed, the capacity control section 72 sets the motor capacity of the slewing motor 10 to the default capacity (step S11). Further, when the slewing direction of the slewing motor 10 is opposite to the direction of the slewing operation inputted by the operator (NO in step S5), that is, when the operator is operating the slewing operation lever 12a in a direction of a so-called reverse lever, the capacity control section 72 sets the motor capacity of the slewing motor 10 to the default capacity (step S11).

On the other hand, when a magnitude of the slewing speed of the slewing motor 10 is more than the threshold value C and the slewing direction of the slewing motor 10 agrees with the direction of the slewing operation inputted by the operator (YES in step S5), the dewing state determination section 73 determines whether or not a motor differential pressure $\Delta P$ is equal to or more than a preset threshold value D (step S6). That is, when the upper slewing body 2 is performing a slewing motion, and the operator is operating the slewing operation lever 12a in the same direction as the slewing direction of the upper slewing body 2 (when the upper slewing body 2 is being slewed in the operation direction), the slewing state determination section 73 determines whether or not a motor differential pressure $\Delta P$ is equal to or more than a preset threshold value D (step S6).

When the motor differential pressure $\Delta P$ is equal to or more than the threshold value D (YES in step S6), the control device 70 determines whether or not an operation amount of the operating lever inputted by the operator for driving the boom cylinder 7 (actuator) is equal to or more than a preset threshold value E (step S7).

When the operation amount relating to the boom cylinder 7 is equal to or more than the threshold value E (YES in step S7), that is, when the combined operation is performed in which the slewing operation for driving the slewing motor 10 and the raising and lowering operation for driving the boom cylinder 7 are performed simultaneously, the capacity control section 72 changes the motor capacity to the set capacity (step S8). Then, the control device 70 repeats the above-described series of steps of the flow (steps S1 to S12). The set capacity is not necessarily set based on the above-described setting example of the motor capacity shown in FIG. 5, and can be set by various methods. When the set capacity is set based on the setting example of the motor capacity shown in FIG. 5, for example, the set capacity is a motor capacity which corresponds to a level of a slewing strength which is selected in advance before an operator operates the slewing-type work machine 100 (see FIG. 5).

When an operation amount relating to the boom cylinder 7 is less than the threshold value E (NO in step S7), the capacity control section 72 performs a control of setting the motor capacity to the default capacity (step S11). That is, when only a slewing operation for driving the slewing motor 10 is performed (during the slewing-only operation), the capacity control section 72 performs a control of setting the motor capacity to the default capacity (step S11). Then, the control device 70 repeats the above-described series of steps of the flow (steps S1 to S12).

On the other hand, the condition that the motor differential pressure $\Delta P$ is less than the threshold value D (NO in step S6) can be an index which indicates that a rotational speed of the slewing motor 10 is lowered, and can be an index which indicates there is a possibility of cavitation. Accordingly, when the motor differential pressure $\Delta P$ is less than the threshold value D, the slewing state determination section 73 determines whether or not a pressure on a meter-out side (MID pressure), that is, a pressure of hydraulic oil at a port on a side where the hydraulic oil of the slewing motor 10 is discharged is less than a preset threshold value F (step S9).

When a pressure on the meter-out side is less than the threshold value F (YES in step S9), the slewing state determination section 73 determines whether or not a slewing speed of the slewing motor 10 is equal to or more than the slewing speed of the slewing motor 10 detected last time based on a slewing speed detection signal detected by the slewing speed detector 83 (step S10). That is, when a brake pressure is not generated in the line (the line 14 or the line 15) connected to the port on a side where the hydraulic oil of the slewing motor 10 is discharged, the slewing state determination section 73 determines whether or not a slewing speed of the slewing motor 10 is equal to or more than the slewing speed of the slewing motor 10 detected last time based on a slewing speed detection signal which corresponds to a magnitude of a slewing speed, a slewing direction, and the like of the upper slewing body 2 detected by the slewing speed detector 83 (step S10).

When a slewing speed of the slewing motor 10 is equal to or more than the slewing speed of the slewing motor 10 detected last time (YES in step S10), that is, when a slewing speed of the upper slewing body 2 is not decreased, the capacity control section 72 executes a control for decreasing the motor capacity (step S12). Then, the control device 70 repeats the above-described series of steps of the flow (steps S1 to S12).

In the present embodiment, the deceleration determination conditions relating to the direction of a slewing operation detected by the slewing operation detection sections 82A and 82B, a slewing speed detected by the slewing speed detector 83, and a differential pressure $\Delta P$ calculated by the differential pressure calculation section 71 are set in advance. In the present embodiment, even in a case where it is determined that the deceleration determination condition is satisfied and the upper slewing body 2 is in a deceleration state (YES in step S3, YES in step S5, NO in step S6), when the cavitation determination condition is satisfied in which a pressure of hydraulic oil at the port from which the hydraulic oil is discharged is less than the preset threshold value F (YES in step S9) and a slewing speed of the upper slewing body 2 is not decreased (YES in step S10), the capacity control section 72 controls the motor capacity such that the capacity of the slewing motor 10 is decreased (step S12). Accordingly, it is possible to suppress the occurrence of cavitation.

When the cavitation determination condition is satisfied, the capacity control section 72 can perform a control of decreasing the motor capacity of the slewing motor 10 from the set capacity or the default capacity toward the minimum capacity in a stepwise manner. When a state arises where the cavitation determination condition is not satisfied in the hydraulic circuit during the processing where the control device 70 repeats the above-described series of steps of the flow (steps S1 to S12), the capacity control section 72 can stop a control of decreasing the motor capacity of the slewing motor 10. Further, when the cavitation determination condition is satisfied, the capacity control section 72 may decrease the motor capacity of the slewing motor 10 from the set capacity or the default capacity to the minimum capacity in one step instead of the above-mentioned stepwise manner.

On the other hand, when a pressure on a meter-out side is equal to or more than the threshold value F (NO in step S9), the capacity control section 72 performs a control of setting the motor capacity to the default capacity (step S11). That is, when a brake pressure is generated in the line (the line 14 or the line 15) connected to the port on a side where the hydraulic oil of the slewing motor 10 is discharged (when the upper slewing body 2 is in the deceleration state), the capacity control section 72 performs a control of setting the motor capacity to the default capacity (step S11). Then, the control device 70 repeats the above-described series of steps of the flow (steps S1 to S12).

Further, in a case where the pressure on the meter-out side is less than the threshold value F (YES in step S9) and a slewing speed of the slewing motor 10 is less than the slewing speed of the slewing motor 10 detected last time (NO in step S10), the capacity control section 72 performs a control of setting the motor capacity to the default capacity (step S11). That is, in a case where a brake pressure is not generated in the line connected to a port on a side where the hydraulic oil of the slewing motor 10 is discharged and a slewing speed of the upper slewing body 2 is decreased, the capacity control section 72 sets the motor capacity to the default capacity (step S11). Then, the control device 70 repeats the above-described series of steps of the flow (steps S1 to S12).

As described above, in the present embodiment, the capacity control section 72 is configured to be able to control the motor capacity to the set capacity such that the motor capacity becomes a capacity which differs from the default capacity during the performance of the combined operation. Accordingly, an operator can operate the upper slewing body 2 and the boom 4 in conformity with the situation of the combined operation, the preference of an operator, and the like. On the other hand, when the slewing state determination section 73 determines that the slewing motion of the upper slewing body 2 is in a deceleration state, the capacity control section 72 controls the motor capacity such that the motor capacity becomes the default capacity irrespective of whether or not the slewing-type work machine is in a combined operation state. Such a control makes it possible to decrease a load on the equipment due to an over torque that occurs when the motor capacity of the slewing motor 10 becomes the first capacity larger than the default capacity during the deceleration of the slewing motion of the upper slewing body 2. In addition, it is possible to avoid a shortage of a brake torque that occurs when the motor capacity is a second capacity smaller than the default capacity. Accordingly, at the time of deceleration of slewing motion of the upper slewing body 2, the constantly stable braking performance (stop performance) can be obtained by the brake circuit.

Further, in the present embodiment, it is possible to determine whether or not the upper slewing body 2 is in a slewing state in an operation direction of the slewing operation based on slewing pilot pressures detected by the slewing operation detection sections 82A and 82B, and a slewing speed of the upper slewing body 2 detected by the slewing speed detector 83. The fact that the effective differential pressure ΔP detected by the hydraulic oil pressure detectors 81A and 81B is less than the preset threshold value D can be an index which indicates that a rotational speed of the slewing motor 10 is decreased. Accordingly, even in a case where it is determined that the upper slewing body 2 is in a slewing state in the operation direction of the slewing operation, when a condition that the effective differential pressure ΔP is less than the threshold value D is satisfied, it is possible to determine that there is a possibility that the upper slewing body 2 is in a deceleration state.

Further, in the present embodiment, it is possible to perform not only the determination of the deceleration state of the slewing of the upper slewing body 2 as described above, but also the determination of the possibility of occurrence of cavitation. By controlling the motor capacity based on the determination on the cavitation, the occurrence of cavitation can be suppressed. In the slewing-type work machine 100, the fact that a pressure on a meter-out side, that is, a pressure of hydraulic oil at the port on a side where the hydraulic oil of the slewing motor 10 is discharged is less than the preset threshold value F can be an index which indicates that a brake pressure is not generated in the line 14 or the line 15 connected to the port. Accordingly, even in a case where it is determined that the upper slewing body 2 is in a deceleration state, when a pressure on the meter-out side is less than the threshold value F, cavitation may occur in the hydraulic circuit. As a specific example, when the slewing-type work machine 100 is positioned on an inclined ground, there may be a case where the upper slewing body 2 is slewed by the gravity while increasing a slewing speed in a gravity acting direction. In such a case, an absorption flow rate of hydraulic oil supplied to the slewing motor 10 becomes smaller than a flow rate of the hydraulic oil corresponding to an actual slewing speed of the upper slewing body 2 and hence, the cavitation may occur in the hydraulic circuit. Accordingly, in the present embodiment, in addition to the fact that the condition for determining whether or not the upper slewing body 2 is in a deceleration state is satisfied, when a pressure on the meter-out side is less than the threshold value F and the slewing state determination section 73 determines that a slewing speed of the upper slewing body 2 is not decreased by comparing slewing speeds detected plural times by the slewing speed detector 83, the capacity control section 72 controls the motor capacity such that the capacity of the slewing motor 10 is decreased. Accordingly, it is possible to suppress the occurrence of cavitation.

Further, the fact that a pressure on a meter-out side is equal to or more than the preset threshold value F can be an index which indicates that a brake pressure is generated in the line 14 or the line 15 connected to the port on a side where the hydraulic oil of the slewing motor 10 is discharged. Accordingly, in the present embodiment, the above-described deceleration determination condition, that is, a deceleration determination condition relating to the direction of the slewing operation detected by the slewing operation detection sections 82A and 82B, the slewing speed detected by the slewing speed detector 83, and the differential pressure ΔP of the slewing motor calculated by the differential pressure calculation section 71 is set in advance. Further, in addition to the fact that the deceleration determination condition is satisfied, when the pressure on a meter-out side is equal to or more than the threshold value F, the capacity control section 72 controls the capacity of the slewing motor 10 such that the motor capacity becomes the default capacity. With such an operation, it is possible to acquire a constantly stable braking performance (stop performance) by the brake circuit at the time of decelerating the slewing of the upper slewing body 2 while increasing the determination accuracy of the deceleration state of the upper slewing body 2.

Further, in the slewing-type work machine 100, the fact that the pressure on a meter-out side is less than the threshold value F can be an index which indicates a fact that a brake pressure is not generated in the line 14 or the line 15 connected to the port on a side where the hydraulic oil of the slewing motor 10 is discharged as described above. In addition, the fact that the pressure on a meter-out side is less than the threshold value F can be an index which indicates that the brake pressure has not yet reached the threshold value F although a tendency that a brake pressure is increasing is observed. Accordingly, in the present embodiment, in the case where the pressure on the meter-out side is less than the threshold value F, and the slewing state determination section 73 determines that a slewing speed of the upper slewing body 2 is decreased by comparing the slewing speeds detected plural times by the slewing speed detector 83, the capacity control section 72 controls the capacity of the slewing motor 10 such that the motor capacity becomes the default capacity. That is, in such a case, although the pressure on a meter-out side, that is, the brake pressure has not reached the threshold value F, a slewing speed of the upper slewing body 2 is actually decreased. Accordingly, it is determined that the slewing motion of the upper slewing body 2 is in a deceleration state. In such a case, the capacity control section 72 controls the capacity of the slewing motor 10 such that the motor capacity becomes the default capacity. With such an operation, it is possible to acquire a constantly stable braking performance (stop performance) by the brake circuit at the time of decelerating the slewing of the upper slewing body 2 while increasing the determination accuracy of the deceleration state of the upper slewing body 2.

Modification

In the above-described embodiment, the case is exemplified where, as shown in the graph in FIG. 5, the operator selects the slewing strength according to preference, and when the combined operation is performed, the motor capacity of the slewing motor 10 is set to the selected target motor capacity (set capacity). However, the present invention is not limited thereto. The set capacity relating to the motor capacity of the slewing motor 10 during the performance of the combined operation may be changed correspondingly to a load of a slewing motion of the upper slewing body 2, a load of a motion of the attachment (for example, the boom 4), a posture of the slewing-type work machine 100, and the like.

In the above-described embodiment, the case is exemplified where, in step S7 of the flowchart shown in FIG. 6, when processing is performed in which only the slewing operation for driving the slewing motor 10 is made (at the time of the slewing only operation), the capacity control section 72 performs a control of setting the motor capacity to the default capacity. However, the present invention is not limited thereto. When the slewing only operation is performed, the motor capacity may be set to a preset set capacity for the slewing only operation which differs from the default capacity.

In the above-described embodiment, in step S10 of the flowchart shown in FIG. 6, the slewing state determination section 73 determines whether or not a slewing speed of the upper slewing body 2 is decreased by determining whether or not the slewing speed of the slewing motor 10 is equal to or more than the slewing speed of the slewing motor 10 detected last time. However, the present invention is not limited thereto. The slewing state determination section 73 may determine whether or not the slewing speed of the upper slewing body 2 is decreased by comparing three or more slewing speeds detected by the slewing speed detector 83.

In the above-described embodiment, the case is exemplified where the slewing operation detection sections 82A and 82B are configured by the right slewing pilot pressure sensor 82A and the left slewing pilot pressure sensor 82B. However, the present invention is not limited thereto. For example, in a case where an operation signal relating to the slewing operation of the slewing operation device is inputted to the control device, and the direction of the slewing operation is detected based on the inputted operation signal, the slewing operation detection section may be configured as a slewing operation detection function of the control device.

As described above, a slewing-type work machine is provided, the slowing-type work machine being capable of obtaining a stable braking characteristic when the slewing motion of the upper slewing body is decelerated while the motor capacity can be set to a capacity suitable for a combined operation when the combined operation is performed.

Provided is a slewing-type work machine which includes a base body; an upper slewing body which is slewably mounted on the base body; an attachment which is mounted on the upper slewing body; a hydraulic pump which discharges hydraulic oil; a slewing motor which is forming of a variable displacement hydraulic motor, the slewing motor being driven so as to slew the upper slewing body with a supply of the hydraulic oil discharged from the hydraulic pump; an actuator which is driven so as to actuate the attachment with a supply of the hydraulic oil discharged from the hydraulic pump; a brake circuit which brakes the slewing motor so as to decelerate slewing motion of the upper slewing body; a slewing state determination section which deteiinines whether or not the slewing motion of the upper slewing body is in a deceleration state; and a capacity control section which controls a motor capacity which is a capacity of the slewing motor which the slewing motor comprises. The capacity control section is configured to set the motor capacity to a capacity set for a combined operation during a performance of the combined operation in which an operation for slewing the upper slewing body and an operation for actuating the attachment are performed simultaneously, while setting the motor capacity to a preset default capacity even during the performance of the combined operation when the slewing state determination section determines that the slewing motion of the upper slewing body is in the deceleration state.

According to this slewing-type work machine, the capacity control section sets the motor capacity to the capacity set for the combined operation during the performance of the combined operation and hence, the upper slewing body and the attachment can be actuated in conformity with a state of the combined operation, the preference of an operator, and the like. On the other hand, when the slewing state determination section determines that the slewing motion of the upper slewing body is in a deceleration state, irrespective of whether or not the combined operation is being performed, the motor capacity is set to the preset default capacity (the motor capacity is made to return to the default capacity), so that a braking characteristic can be kept constant. Accordingly, the operator can decelerate the slewing motion of the upper slewing body by the stable braking characteristic and can safely stop the upper slewing body.

It is preferable that, in the slewing-type work machine, the slewing motor is configured to have a first port and a second port, and is configured to rotate in a direction corresponding to one of the first port and the second port by receiving a supply of hydraulic oil to the one of the ports, and to discharge the hydraulic oil from the other port. It is preferable that the slewing-type work machine further includes: a slewing operation device which receives a slewing operation for slewing the upper slewing body; a slewing operation detection section which detects a direction of the slewing operation given to the slewing operation device; a slewing speed detector which detects a slewing speed of the upper slewing body; a hydraulic oil pressure detector which detects a pressure of the hydraulic oil at the first port and a pressure of the hydraulic oil at the second port; and a differential pressure calculation section which calculates a differential pressure of the slewing motor which is a difference between the pressure of the hydraulic oil at the first port and the pressure of the hydraulic oil at the second port based on the slewing speed detected by the slewing speed detector and the pressures of the hydraulic oil detected by the hydraulic oil pressure detector. It is preferable that the slewing state determination section is configured to determine whether or not the slewing motion of the upper slewing body is in the deceleration state based on the direction of the slewing operation detected by the slewing operation detection section, the slewing speed detected by the slewing speed detector, and the differential pressure calculated by the differential pressure calculation section.

In such a configuration, the satisfying of a deceleration determination condition relating to the direction of the slewing operation, the slewing speed, and the differential pressure is set as a determination condition of the deceleration state and hence, the determination of the deceleration state can be suitably performed by taking into account the direction of the slewing operation by the operator, the actual slewing speed of the upper slewing body, and the differential pressure of the slewing motor.

It is preferable that, in the slewing-type work machine, the slewing state determination section is configured to determine whether or not the upper slewing body is in a slewing state in the operation direction of the slewing operation based on the direction of the slewing operation detected by the slewing operation detection section and the slewing speed detected by the slewing speed detector, and to determine that the slewing motion of the upper slewing body is in the deceleration state when the upper slewing body is in the slewing state in the operation direction of the slewing operation and the differential pressure calculated by the differential pressure calculation section is less than a preset threshold value.

In such a configuration, the slewing speed detector can detect the slewing speed of the upper slewing body, that is, the magnitude of the slewing speed and the slewing direction. Accordingly, the slewing state determination section can determine whether or not the upper slewing body is in a slewing state in the direction of the slewing operation based on the direction of the slewing operation detected by the slewing operation detection section and the slewing speed (the magnitude of the slewing speed and the direction of the slewing) detected by the slewing speed detector. The fact that the differential pressure (effective differential pressure) of the slewing motor calculated by the differential pressure calculation section is small, that is, the fact that the differential pressure is less than the preset threshold value can be an index which indicates that the rotational speed of the slewing motor is decreased. Accordingly, the slewing state determination section can determine the possibility that the upper slewing body is in a deceleration state based on the differential pressure when the upper slewing body is in a slewing state in the operation direction of the slewing operation.

It is preferable that, in the slewing-type work machine, the capacity control section controls the motor capacity such that the capacity of the slewing motor is decreased when a pressure of the hydraulic oil at the other port from which the hydraulic oil is discharged is less than a preset threshold value and the slewing speed of the upper slewing body is not decreased even in a case where the slewing state determination section determines that the slewing motion of the upper slewing body is in the deceleration state.

With such a configuration, it is possible to determine not only the deceleration state of the slewing motion of the upper slewing body based on the above-described deceleration determination condition but also the possibility of the cavitation. By controlling the motor capacity based on the determination on the cavitation, the occurrence of cavitation can be suppressed. Specifically, for example, it is determined whether or not a cavitation determination condition, relating to the pressure on a meter-out side and the presence or non-presence of the decrease of the slewing speed of the upper slewing body, is satisfied. In this determination, it is possible to determine whether or not there is a possibility that an absorption flow rate of hydraulic oil supplied to the slewing motor is smaller than a flow rate which corresponds to an actual slewing speed of the upper slewing body (specifically, a flow rate decided according to a slewing speed and a motor capacity). Accordingly, with such a configuration, even in a case where it is determined that the deceleration determination condition is satisfied and the upper slewing body is in a deceleration state, when the cavitation determination condition is further satisfied, the capacity control section controls a motor capacity such that a capacity of the slewing motor is decreased and hence, it is possible to suppress the occurrence of cavitation.

The invention claimed is:
1. A slewing-type work machine comprising:
a base body;
an upper slewing body which is slewably mounted on the base body;
an attachment which is mounted on the upper slewing body;
a hydraulic pump which discharges hydraulic oil;
a slewing motor which is formed of a variable displacement hydraulic motor, the slewing motor being driven so as to slew the upper slewing body with a supply of the hydraulic oil discharged from the hydraulic pump;
an actuator which is driven so as to actuate the attachment with a supply of the hydraulic oil discharged from the hydraulic pump;
a brake circuit which brakes the slewing motor so as to decelerate a slewing motion of the upper slewing body; and
an electronic controller including:
a slewing state determination section which determines whether or not the slewing motion of the upper slewing body is in a deceleration state, and
a capacity control section which controls a motor capacity of the slewing motor, wherein the capacity control section is configured to set the motor capacity to a capacity set for a combined operation during a performance of the combined operation in which an operation for slewing the upper slewing body and an operation for actuating the attachment are performed simultaneously, while setting the motor capacity to a preset default capacity even during the performance of the combined operation when the slewing state determination section determines that the slewing motion of the upper slewing body is in the deceleration state.

2. The slewing-type work machine according to claim 1, wherein
the slewing motor is configured to have a first port and a second port, and is configured to rotate in a direction corresponding to one of the first port and the second port by receiving a supply of the hydraulic oil to the one of the ports and to discharge the hydraulic oil from the first port or the second port that does not receive the supply of the hydraulic oil, and
the slewing-type work machine further comprises:
a slewing operation device including a slewing operation lever and a pilot valve, which receives a slewing operation for slewing the upper slewing body;
a slewing operation detection section including a pilot pressure sensor, which detects a direction of the slewing operation given to the slewing operation device;
a slewing speed detector which detects a slewing velocity of the upper slewing body;
a hydraulic oil pressure detector which detects a pressure of the hydraulic oil at the first port and a pressure of the hydraulic oil at the second port; and
a differential pressure calculation section included in the electronic controller, which calculates a differential pressure of the slewing motor, which is a difference between the pressure of the hydraulic oil at the first port and the pressure of the hydraulic oil at the second port, based on the slewing velocity detected by the slewing speed detector and the pressures of the hydraulic oil detected by the hydraulic oil pressure detector, and
the slewing state determination section is configured to determine whether or not the slewing motion of the upper slewing body is in the deceleration state based on the direction of the slewing operation detected by the slewing operation detection section, the slewing velocity detected by the slewing speed detector, and the differential pressure calculated by the differential pressure calculation section.

3. The slewing-type work machine according to claim 2, wherein
the slewing state determination section is configured to determine whether or not the upper slewing body is in a slewing state in an operation direction of the slewing operation based on the direction of the slewing operation detected by the slewing operation detection section and the slewing velocity detected by the slewing speed detector, and
to determine that the slewing motion of the upper slewing body is in the deceleration state when the upper slewing body is in the slewing state in the operation direction of the slewing operation and the differential pressure calculated by the differential pressure calculation section is less than a preset threshold value.

4. The slewing-type work machine according to claim 3, wherein
even in a case where the slewing state determination section determines that the slewing motion of the upper slewing body is in the deceleration state, the capacity control section controls the motor capacity such that the capacity of the slewing motor is decreased when a pressure of the hydraulic oil at the first port of the second port from which the hydraulic oil is discharged is less than a second preset threshold value and the slewing velocity of the upper slewing body is not decreased.

5. The slewing-type work machine according to claim 2, wherein
even in a case where the slewing state determination section determines that the slewing motion of the upper slewing body is in the deceleration state, the capacity control section controls the motor capacity such that the capacity of the slewing motor is decreased when a pressure of the hydraulic oil at the first port or the second port from which the hydraulic oil is discharged is less than a preset threshold value and the slewing velocity of the upper slewing body is not decreased.

* * * * *